(12) United States Patent
Valle

(10) Patent No.: US 7,442,140 B2
(45) Date of Patent: *Oct. 28, 2008

(54) GEAR ASSEMBLY FOR A BICYCLE GEAR CHANGE

(75) Inventor: Maurizio Valle, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/384,971

(22) Filed: Mar. 20, 2006

(65) Prior Publication Data

US 2006/0166770 A1 Jul. 27, 2006

Related U.S. Application Data

(63) Continuation of application No. 10/418,503, filed on Apr. 18, 2003, now Pat. No. 7,022,037.

(30) Foreign Application Priority Data

Apr. 18, 2002 (EP) .................................. 02425244

(51) Int. Cl.
*F16H 55/12* (2006.01)

(52) U.S. Cl. ...................................... 474/152

(58) Field of Classification Search .................. 474/69, 474/78, 152, 160
See application file for complete search history.

(56) References Cited

U.S. PATENT DOCUMENTS

| 4,598,608 | A | 7/1986 | Ueno |
|---|---|---|---|
| 4,988,328 | A | 1/1991 | Iwasaki et al. |
| 5,133,695 | A | 7/1992 | Kobayashi |
| 5,503,598 | A | 4/1996 | Neuer et al. |
| 5,545,096 | A | 8/1996 | Su |
| 5,716,297 | A | 2/1998 | Bodmer |
| 5,738,603 | A | 4/1998 | Schmidt et al. |
| 5,935,003 | A | 8/1999 | Tseng et al. |
| 6,007,442 | A | 12/1999 | Schmidt |
| 6,045,472 | A * | 4/2000 | Sung et al. ................... 474/160 |
| 7,022,037 | B2 * | 4/2006 | Valle .......................... 474/152 |
| 2004/0018904 | A1 | 1/2004 | Valle |

FOREIGN PATENT DOCUMENTS

| DE | 43 30 989 A1 | 3/1995 |
|---|---|---|
| DE | 297 19 952 U1 | 1/1998 |
| DE | 197 03 930 A1 | 8/1998 |
| EP | 0 414 907 A1 | 3/1991 |
| EP | 0 716 976 A2 | 6/1996 |

* cited by examiner

*Primary Examiner*—Vicky A Johnson
(74) *Attorney, Agent, or Firm*—Volpe and Koenig PC

(57) ABSTRACT

Gear assembly for a bicycle gear change, comprising at least one gear with a larger diameter and at least one gear with a smaller diameter. The selected gear, generally of a larger diameter, has at least one sector dedicated to upwards shifting that may include a plurality of shifting aid means to facilitate upwards shifting and a second gear, generally of a smaller diameter, has at least one sector dedicated to downwards shifting that may include a plurality of shifting aid means to facilitate downwards shifting.

51 Claims, 4 Drawing Sheets

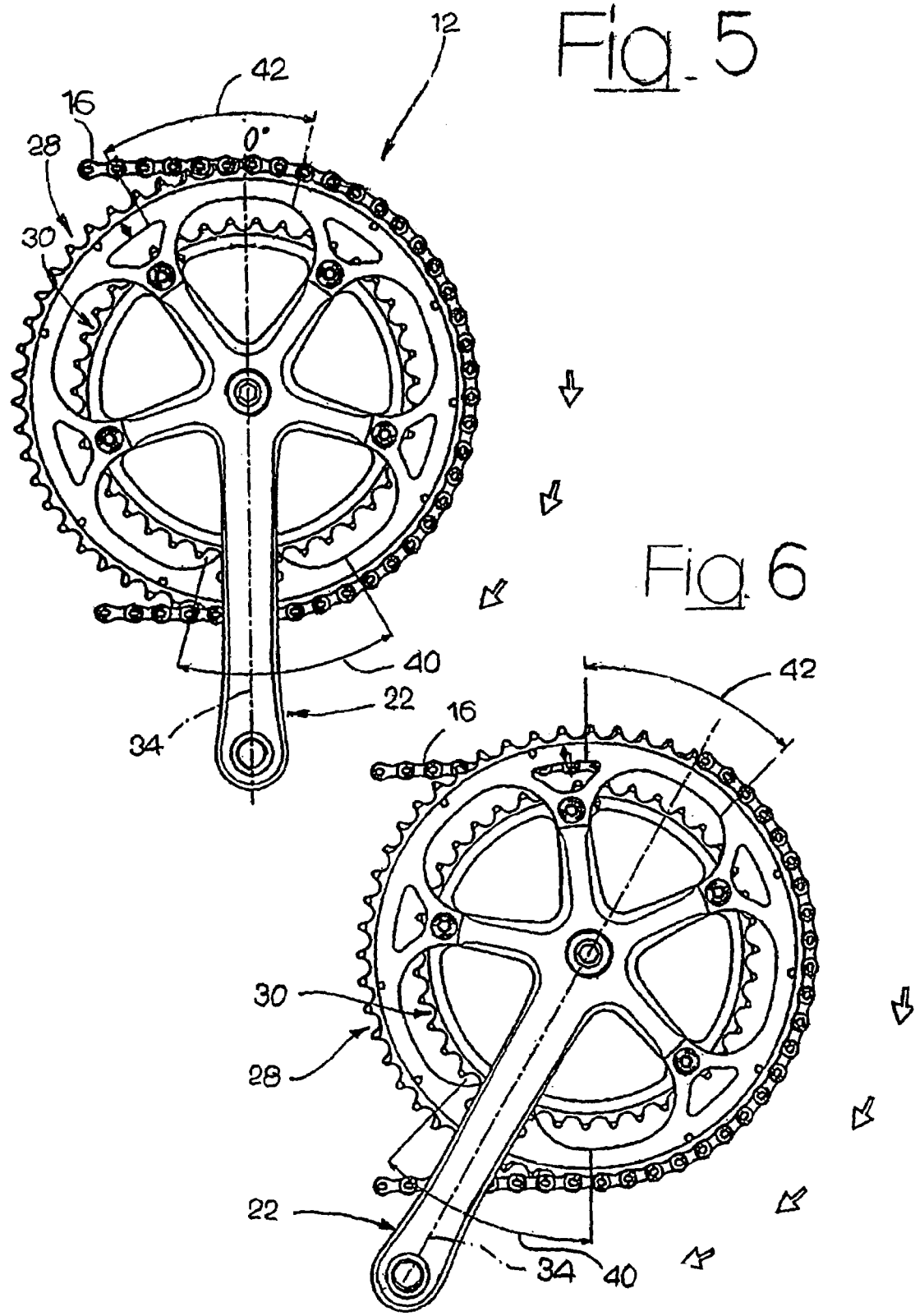

Fig_7
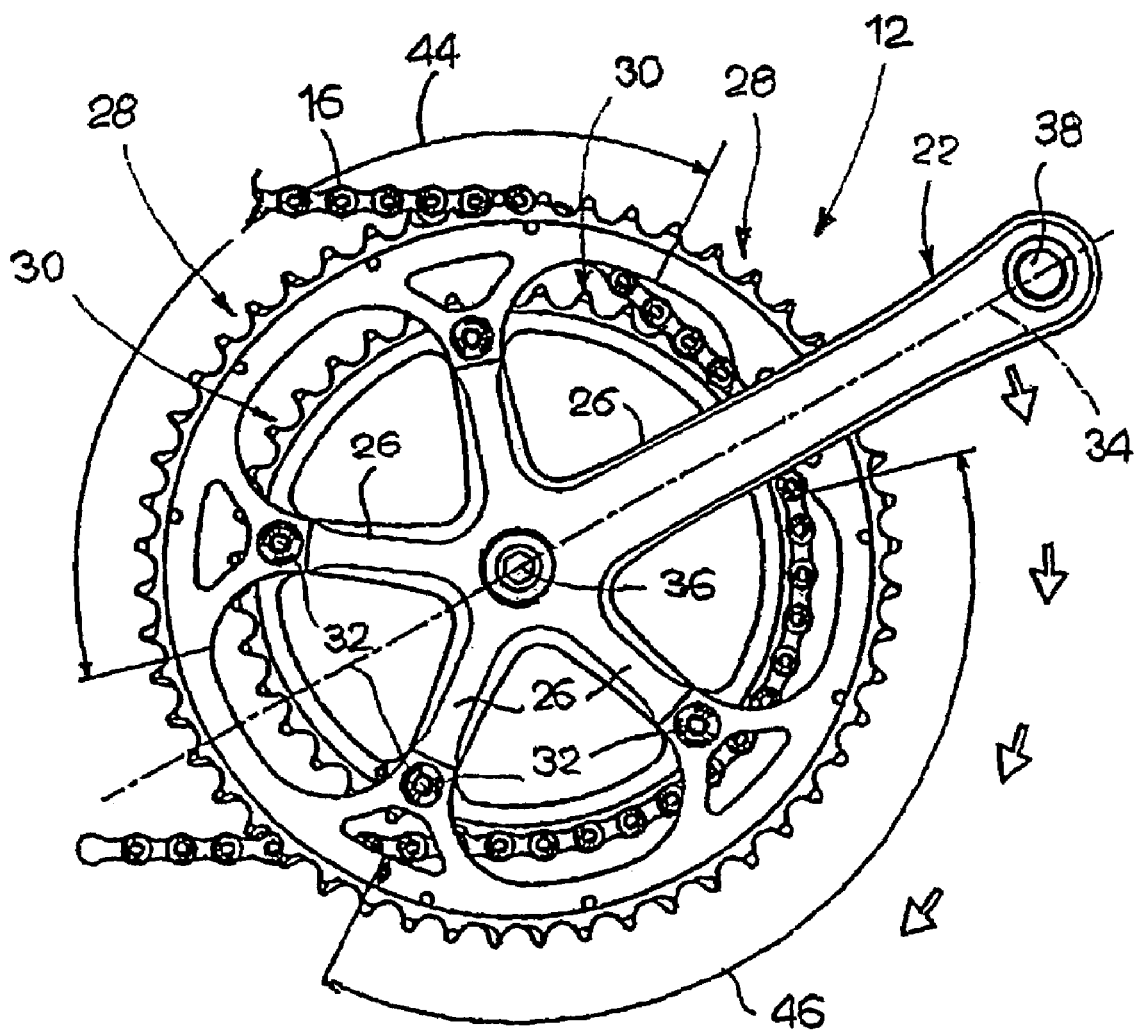

GEAR ASSEMBLY FOR A BICYCLE GEAR CHANGE

FIELD OF INVENTION

The present invention relates to a gear assembly for a bicycle gear change.

BACKGROUND

The present invention improves the gear change between a gear with a smaller diameter and a gear with a larger diameter and vice versa. In the present description and in the accompanying claims, "gear change" is intended as the operation through which the transmission chain of the bicycle passes from a condition in which it engages one gear to a condition in which the chain engages another gear of the same gear assembly. A gear change always requires the chain shifting from one gear to another which may be adjacent or not to one another. In the description and in the claims the term "upwards shifting" indicates the operation of gear change from a gear with a smaller diameter to a gear with a larger diameter and the term "downwards shifting" indicates the operation of gear change from a gear with a larger diameter to a gear with a smaller diameter.

The present invention has particular application to the front bicycle gear assembly but it may also be applied to the rear sprocket gear assembly. Within the present specification, the term "gear" means an element suitable to engage a bicycle chain, such as a toothed chain wheel or a toothed sprocket wheel.

Especially in the field of racing bicycles, it is particularly important to have gear changes performed smoothly and without wrenching shifting operations, both upwards and downwards, in all riding conditions. Various constructional contrivances have already been proposed with the purpose of favouring gear change, for example in relation to the form of the gear teeth, to shifting aid means including rivets which project axially from the plane of the gear, or to reciprocal positioning of the gears.

SUMMARY

Notwithstanding the various prior art efforts to facilitate shifting, there is still the need to improve shifting conditions so they are smoother and more precise, especially in particular conditions, such as when changing under stress.

The object of the present invention is to provide an improved type of gear assembly which satisfies the aforesaid desires.

The invention provides a bicycle gear assembly of two or more gears assembled to cooperate with a common transmission chain that is mounted on a bicycle to be movable between them for upwards and downwards shifting. The assembly has at least one gear of a first diameter and at least one gear of second smaller diameter. One of the gears includes at least one sector dedicated to upwards shifting and the other includes at least one sector dedicated to downwards shifting. Preferably, a shifting aid is provided for each sector.

BRIEF DESCRIPTION OF THE DRAWING(S)

The present invention is described in detail, with reference to the accompanying drawings, in which:

FIGS. 5 and 6 illustrate the gear assembly according to the present invention during a downwards shifting; and FIG. 7 illustrates the gear assembly according to the present invention during an upwards shifting.

DETAILED DESCRIPTION OF THE PREFERRED EMBODIMENT(S)

Figure 1:
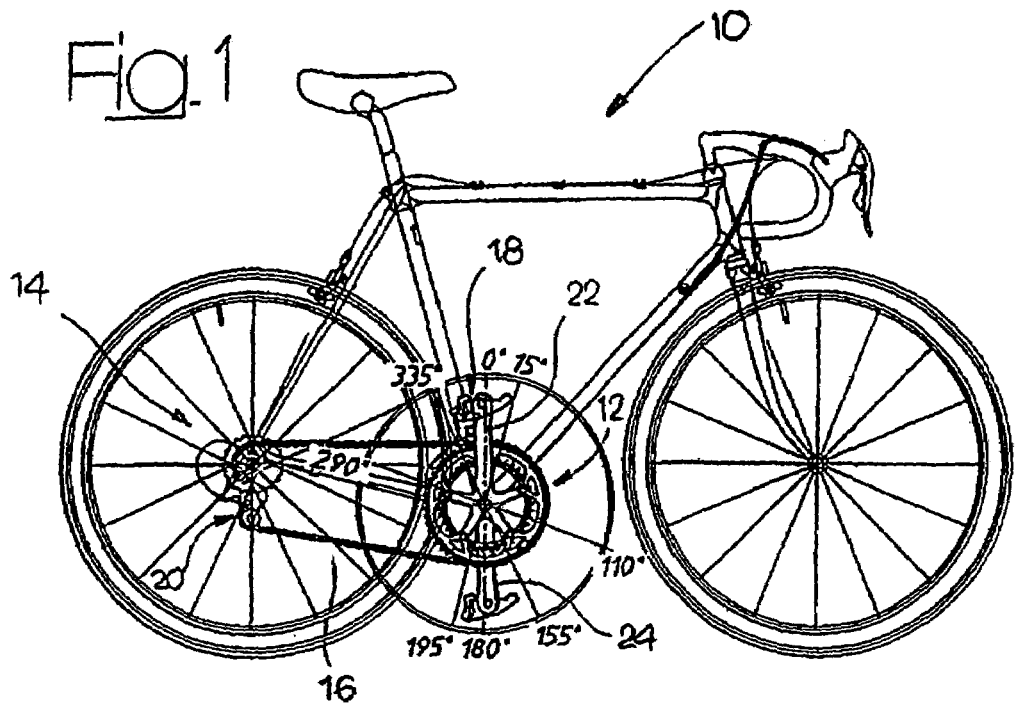
FIG. 1 is a schematic side view of a bicycle.

In FIG. 1, the number 10 indicates a racing bicycle including a front gear assembly 12 and a rear sprocket assembly 14 connected to each other by a chain 16. The bicycle 10 comprises a front derailleur 18 to control gear change on the front gear assembly 12 and a rear derailleur 20 to control gear change on the rear sprockets 14. The front gear assembly 12 comprises a right pedal crank 22 and a left pedal crank 24.

FIG. 1 indicates, as reference position for the rotation angles of the pedal cranks 22 and 24, the position in which the right pedal crank 22 is vertical in the upward position for which the value of 0° has been assigned, and the left pedal crank 24 is directly opposed in the forward position for which 180° has been assigned.

The present invention originates from the discovery that by dedicating some sectors of the gears to downwards shifting and other sectors of the same gears to upwards shifting, both types of shifting are improved. It is also based confirmed by experiments that during racing some angular positions are particularly suited to optimally perform downwards shifting, that is from the gear with the larger diameter to the gear with the smaller diameter while, on the contrary, other angular positions are more suited to optimally perform upwards shifting, that is from the gear with the smaller diameter to the gear with the larger diameter.

In the present invention, at least one of the gears of the assembly presents sectors dedicated (or specialized) for a selected type of shifting (downwards or upwards shifting). In particular, the invention proposes that at least one gear has at least one sector dedicated to downwards shifting, and at least one sector dedicated to upwards shifting. As shall be described below, the downwards shifting sector is provided with shifting aid means which facilitate downwards shifting, and the upwards shifting sector is provided with shifting aid means which facilitate upwards shifting. Preferably, two downward shifting sectors which coincide with the zones of the gears by the axis of the pedal crank and two upward shifting sectors by the zones of the gears complementary to those dedicated to downwards shifting, are provided.

Figure 2:
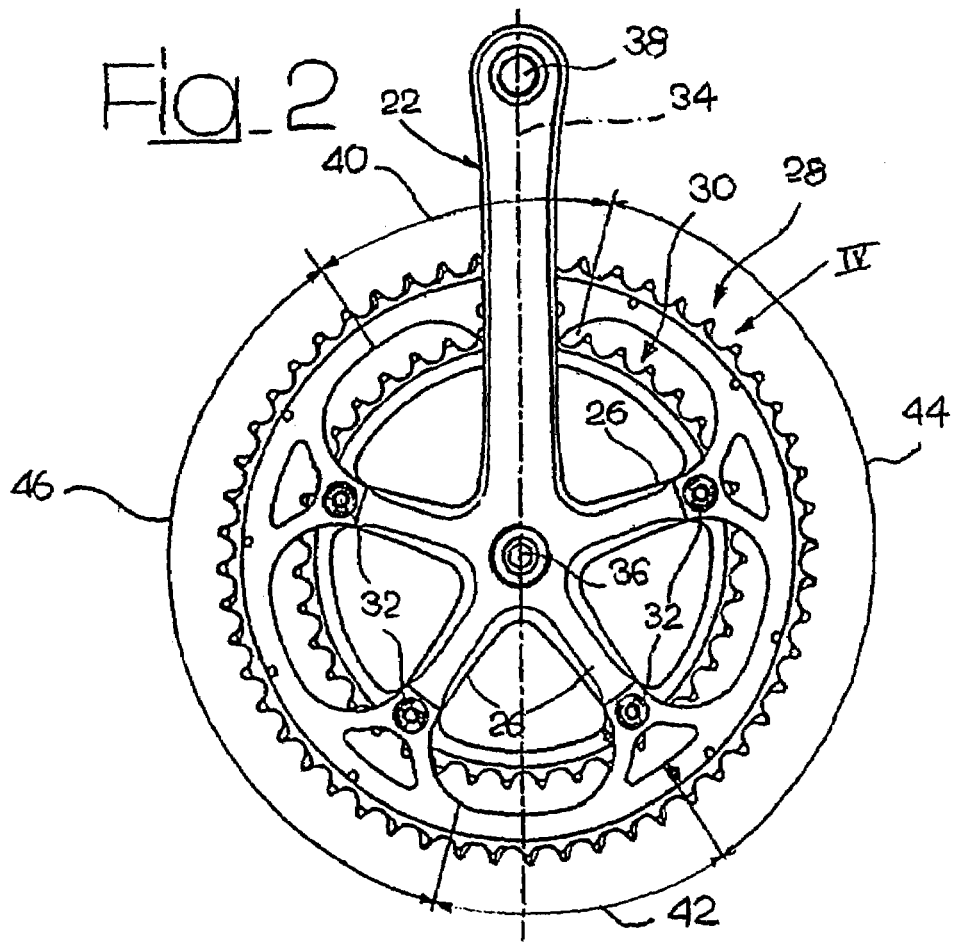
FIG. 2 is a front elevation of a gear assembly according to the present invention.

FIG. 2 shows an embodiment of the present invention applied to a front gear assembly 12 comprising a right pedal crank 22 provided with radial arms 26 to which a gear with a larger diameter 28 and a gear with a smaller diameter 30 are fixed. For those skilled in the field, it is evident that the description expands to the case of a front gear assembly with three gears. In that case the intermediate gear is considered as the smaller diameter gear when considering the gears pair formed by the larger and by the intermediate gear, while it is considered as the larger diameter gear when considering the gears pair formed by the intermediate and by the smaller gear. In like manner, the present invention may also be applied to the rear sprocket assembly 14.

With reference to FIG. 2, the gear with the larger diameter 28 is mounted on the pedal crank 22 so as to establish a univocal angular relation with it. This may be obtained by positioning or shaping the fixing zones 32 between the gear 28 and the pedal crank 22 so as to define a univocal assembly position of the gear 28 in relation to the pedal crank 22.

The pedal crank 22 has a longitudinal axis 34 which links the centre of the hole 36 for the connection to the bottom bracket spindle with the centre 38 of the hole for the connection to the pedal.

The gear with the larger diameter 28 is divided into four sectors complementary to one another: two smaller downwards shifting sectors 40, 42 and two larger upwards shifting sectors 44, 46. The sectors 40, 42 are diametrically opposite each other and are provided with shifting aid means which facilitate downwards shifting, that is from the gear with the larger diameter 28 to the gear with the smaller diameter 30. Also sectors 44, 46 are diametrically opposite each other and are provided with shifting aid means which facilitate upwards shifting, that is from the gear with the smaller diameter 30 to the gear with the larger diameter 28.

Figure 3:
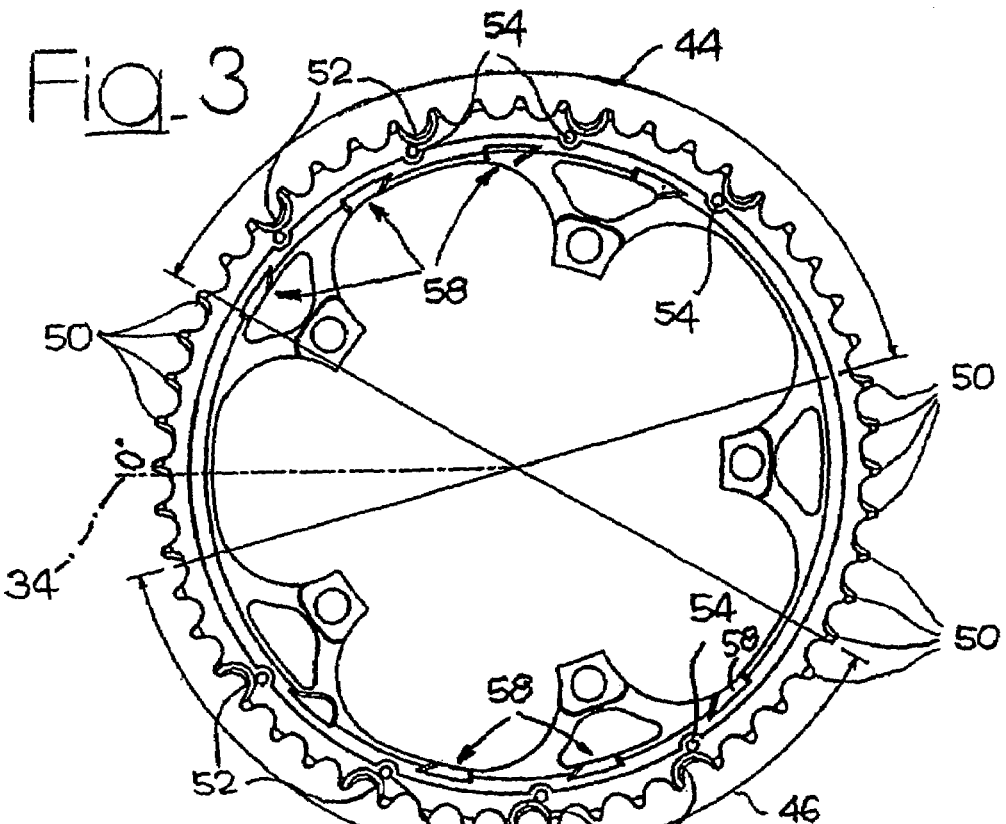
FIGS. 3 and 4 are front elevations of the two opposed faces of the gear in the direction indicated by the arrow IV in FIG. 2.

The longitudinal axis 34 of the pedal crank 22 intersects the two downwards shifting sectors 40, 42 as shown in FIG. 2. As shown in FIG. 3, the two sectors 40, 42 have a common median axis 35 which is angularly displaced in relation to the longitudinal axis 34 in the opposite direction to the racing direction, by a value between 5° and 15°. The two upwards shifting sectors 44, 46 have a common median axis that is positioned at 90° in relation to the median axis of the downwards shifting sectors 40, 42. The two downwards shifting sectors 40, 42 have substantially the same angular width, which is preferably between 30° and 70°, and even more preferably between 35° and 45°. The two upwards shifting sectors have substantially the same angular width, which is preferably between 110° and 150°, and even more preferably between 135° and 145°. If, as stated, the longitudinal axis 34 of the pedal crank 22 is considered as the reference axis for the angular positions, and the longitudinal axis 34 has the value of 0°, in the embodiment of the invention shown in the Figures the downwards shifting sector 40 extends from 335° to 15°, the upwards shifting sector 44 extends from 15° to 155°, the downwards shifting sector 42 extends from 155° to 195° and the upwards shifting sector 46 extends from 195° to 335°. Of course, these values may vary in other embodiments of the present invention.

It can be seen that the sectors dedicated to upwards shifting have a greater angular width than the sectors dedicated to downwards shifting. Preferably, the ratio between the angular upward shifting sectors and the angular downward shifting sectors is preferably between 1.5 and 5, and even more preferably between 2.5 and 4.5.

The upwards shifting and the downwards shifting sectors may be produced in any known way in the art with shifting the aids. The important factor is that the downward shifting aids favor disengaging of the chain from the larger diameter gear when the chain is subjected to thrust in the direction parallel to the rotation axis of the gear which removes the chain from the gear, while the upwards shifting aid means are made so that they favor engaging of the chain with the gear with the larger diameter when the chain is subjected to thrust in the direction parallel to the rotation axis of the gear which draws the chain towards the gear.

Figure 4:
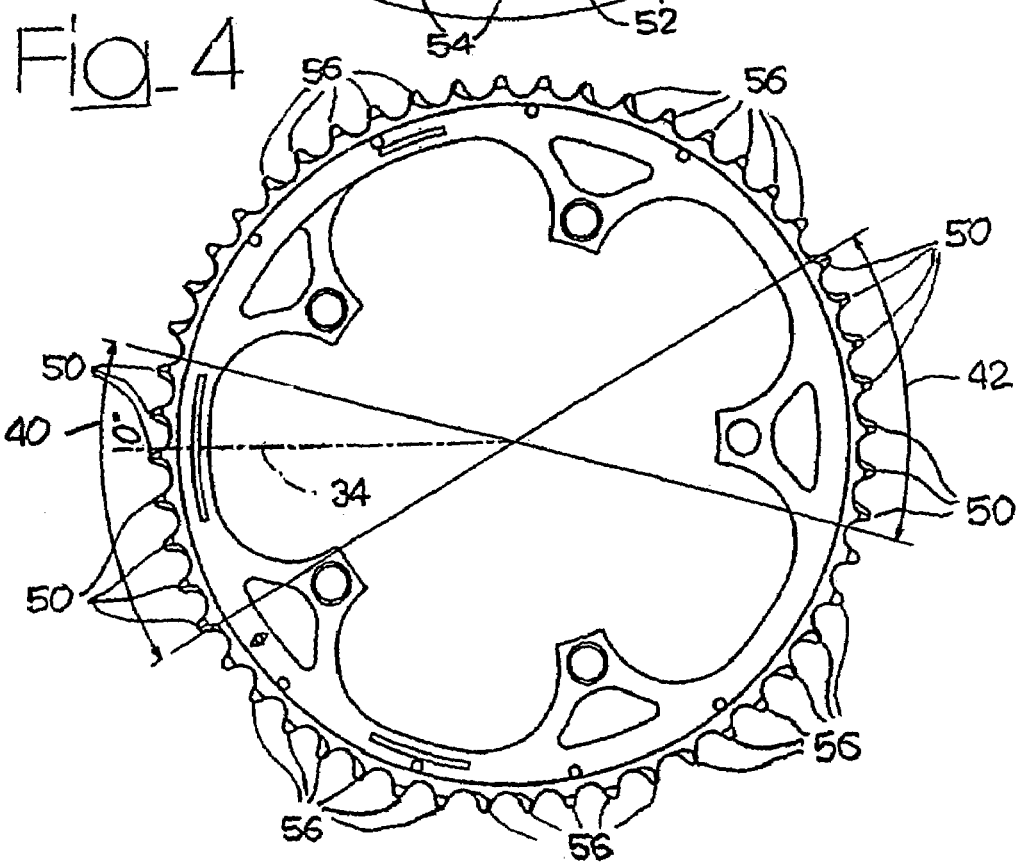

One embodiment of the invention is illustrated in FIGS. 3 and 4 where, the face of the larger diameter gear 28 is facing the smaller diameter gear 30, FIG. 3 and the face of the gear 28 opposite to the one facing the gear with the smaller diameter 30 FIG. 4. The downwards shifting aid may be formed by bevels 50 formed on one or both faces of the gear 28 and/or on one or both sides of the teeth. Preferably, all teeth in the downward shifting sectors 40, 42 are provided with bevels 50.

Again with reference to FIGS. 3 and 4, the upwards shifting aid comprises:

relief cuts 52 formed in the groove between two adjacent teeth on the face of the gear 28 facing towards the smaller diameter gear, pockets 58 are formed on the face of the gear 28 facing the smaller diameter gear, adjacent the inner circumferential edge 57 of the gear, pins 54 for engaging the chain, project from the face of the gear 28 towards the gear with the smaller diameter 30 in positions between the gear teeth and the pockets 58, and bevels 56, as shown in FIG. 4, are formed on the sides of at least two teeth preceding each pin 54 in the direction of rotation of the gear 28, formed on the face of the gear opposite to the one facing the gear with the smaller diameter 30.

The upwards shifting aids are positioned in the most favourable angular positions inside the respective sectors 44, 46.

FIGS. 5 and 6 show a downwards shifting operation. Initially, the chain engages the larger diameter gear 28 as shown in FIG. 5 and it is shifted by the derailleur towards the smaller diameter gear 30 to cause the gear change to the smaller diameter gear 30 as shown in FIG. 6. Consequently, the downwards shifting operation is performed by the sectors 40, 42. Experiments have shown that the conditions for downwards shifting are favoured when this shifting occurs in angular sectors of the gear by the axis of the pedal crank.

FIG. 7 shows the gear assembly 12 according to the present invention during an upward shifting operation, that is from the smaller diameter gear 30 to the larger diameter gear 28. Subdivision of the gear with the larger diameter 28 into upwards and downwards shifting sectors makes the upwards shifting occurring by the sectors 44, 46. Experiments have shown that the conditions for upwards shifting are favoured when this shifting occurs in angular sectors of the gear complementary to those dedicated to downwards shifting.

What is claimed is:

1. Gear assembly for a bicycle gear change, comprising at least one gear with a larger diameter and at least one gear with a smaller diameter, said gears being destined to cooperate with a chain shiftable from one to the other of said gears, to perform a gear change, wherein said gear with a larger diameter comprises at least one sector dedicated to upwards shifting, including shifting aids to facilitate upwards shifting, and at least one sector dedicated to downwards shifting including shifting aids to facilitate downwards shifting, wherein said at least one sector dedicated to upwards shifting has a larger angular extension than said at least one sector dedicated to downwards shifting.

2. Gear assembly according to claim 1, further comprising two downwards shifting sectors diametrically opposite to each other.

3. Gear assembly according to claim 1, further comprising two upwards shifting sectors diametrically opposite to each other.

4. Gear assembly according to claim 1, wherein said downwards and said upwards shifting sectors are complementary to each other.

5. Gear assembly according to claim 1, wherein said at least one sector for downwards shifting is positioned in an area of said gear with larger diameter destined to be crossed by the longitudinal axis of a pedal crank, when mounted on the gear assembly.

6. Gear assembly according to claim 1, further comprising a pedal crank having a longitudinal axis mounted in a fixed position in relation to said gear with larger diameter.

7. Gear assembly according to claim 6, wherein said at least one sector for downwards shifting has a median axis angularly displaced in relation to the longitudinal axis of the pedal crank.

8. Gear assembly according to claim 7, wherein the median axis of said at least one sector for downwards shifting is angularly displaced in relation to the longitudinal axis of the pedal crank by a value between 5° and 15°.

9. Gear assembly according to claim 8, wherein said at least one upwards shifting sector has a median axis arranged substantially at 90° in relation to the median axis of said at least one downwards shifting sector.

10. Gear assembly according to claim 1, wherein the shifting aids that facilitate downwards shifting comprise bevels formed on teeth attached to the larger diameter gear.

11. Gear assembly according to claim 1, wherein the shifting aids that facilitate upwards shifting comprise relief cuts formed in a groove between two adjacent teeth on the larger diameter gear.

12. Gear assembly according to claim 1, wherein the shifting aids that facilitate upwards shifting comprise pockets adjacent an inner circumferential edge of the larger diameter gear, and formed on the larger diameter gear facing the smaller diameter gear.

13. Gear assembly for a bicycle gear change, comprising at least one gear with a larger diameter and at least one gear with a smaller diameter, said gears being destined to cooperate with a chain shiftable from one to the other of said gears, to perform a gear change, wherein said gear with a larger diameter comprises at least one sector dedicated to upwards shifting, including shifting aids to facilitate upwards shifting, and at least one sector dedicated to downwards shifting including shifting aids to facilitate downwards shifting, wherein each of said sectors for downwards shifting have an angular extension between 30° and 70°.

14. Gear assembly for a bicycle gear change, comprising at least one gear with a larger diameter and at least one gear with a smaller diameter, said gears being destined to cooperate with a chain shiftable from one to the other of said gears, to perform a gear change, wherein said gear with a larger diameter comprises at least one sector dedicated to upwards shifting, including shifting aids to facilitate upwards shifting, and at least one sector dedicated to downwards shifting including shifting aids to facilitate downwards shifting, wherein each of said sectors for downwards shifting have an angular extension between 35° and 45°.

15. Gear assembly for a bicycle gear change, comprising at least one gear with a larger diameter and at least one gear with a smaller diameter, said gears being destined to cooperate with a chain shiftable from one to the other of said gears, to perform a gear change, wherein said gear with a larger diameter comprises at least one sector dedicated to upwards shifting, including shifting aids to facilitate upwards shifting, and at least one sector dedicated to downwards shifting including shifting aids to facilitate downwards shifting, wherein each of said sectors for upwards shifting have substantially an angular extension between 110° and 150°.

16. Gear assembly for a bicycle gear change, comprising at least one gear with a larger diameter and at least one gear with a smaller diameter, said gears being destined to cooperate with a chain shiftable from one to the other of said gears, to perform a gear change, wherein said gear with a larger diameter comprises at least one sector dedicated to upwards shifting, including shifting aids to facilitate upwards shifting, and at least one sector dedicated to downwards shifting including shifting aids to facilitate downwards shifting, wherein each of said sectors for upwards shifting have an angular extension between 135° and 145°.

17. A bicycle gear assembly of two or more gears assembled to cooperate with a common transmission chain that is mounted on a bicycle to be movable between them for upwards and downwards shifting, the assembly comprising: at least one gear of a first diameter and at least one gear of second smaller diameter, and one of said gears includes at least one sector dedicated to upwards shifting and the other of said gears includes at least one sector dedicated to downwards shifting, wherein said at least one sector dedicated to upwards shifting has a larger angular extension than said at least one sector dedicated to downwards shifting.

18. The gear assembly according to claim 17, wherein the first diameter gear includes the downwards shifting sector.

19. The gear assembly according to claim 18, wherein the first diameter gear includes at least two downwards shifting sectors which are positioned diametrically opposite to each other.

20. The gear assembly according to claim 18, wherein the second smaller diameter gear includes the upwards shifting sector.

21. The gear assembly according to claim 17, wherein the second smaller diameter gear includes the upwards shifting sector.

22. The gear assembly according to claim 17, wherein the second smaller gear includes two upwards shifting sectors which are positioned diametrically opposite to each other.

23. The gear assembly according to claim 17, wherein said downwards and said upwards shifting sectors are complementary to each other.

24. The gear assembly according to claim 17, wherein the upwards shifting sector includes a shifting aid.

25. The gear assembly according to claim 17, wherein the downwards shifting sector includes a shifting aid.

26. The gear assembly according to claim 17 wherein the upwards and downwards shifting sectors include a shifting aid.

27. The bicycle gear assembly of claim 17, further comprising bevels formed on teeth attached to the gear located in the sector dedicated to downwards shifting.

28. The bicycle gear assembly of claim 17, further comprising relief cuts formed in a groove between two adjacent teeth on the larger diameter gear located in the sector dedicated to upwards shifting.

29. The bicycle gear assembly of claim 28, further comprising pockets adjacent an inner circumferential edge of the larger diameter gear, and formed on the larger diameter gear facing the smaller diameter gear.

30. The bicycle gear assembly of claim 29, further comprising pins that engage the chain, said pins projecting from a face of the larger diameter gear towards the smaller diameter gear in positions between the teeth and the pockets.

31. The bicycle gear assembly of claim 30, further comprising bevels formed on sides of at least two teeth preceding each pin in a direction of rotation of the gear, the pins formed on a face of the larger diameter gear opposite to a face facing the smaller diameter gear.

32. A bicycle gear assembly of two or more gears assembled to cooperate with a common transmission chain that is mounted on a bicycle to be movable between them for upwards and downwards shifting, the assembly comprising: at least one gear of a first diameter and at least one gear of second smaller diameter, and one of said gears includes at least one sector dedicated to upwards shifting and the other of said gears includes at least one sector dedicated to downwards shifting;

wherein the upwards and downwards shifting sectors include a shifting aid;

wherein the shifting aid facilitates upwards shifting and further comprises pins that engage the chain, said pins projecting from a face of the larger diameter gear towards the smaller diameter gear.

33. A bicycle gear assembly of two or more gears assembled to cooperate with a common transmission chain that is mounted on a bicycle to be movable between them for upwards and downwards shifting, the assembly comprising: at least one gear of a first diameter and at least one gear of second smaller diameter, and one of said gears includes at least one sector dedicated to upwards shifting and the other of said gears includes at least one sector dedicated to downwards shifting;

wherein the upwards and downwards shifting sectors include a shifting aid;

wherein the shifting aid facilitates upwards shifting and further comprises bevels formed on sides of at least two teeth preceding each pin in a direction of rotation of the gear, the pins formed on a face of the larger diameter gear opposite to a face facing the smaller diameter gear.

34. Gear assembly for a bicycle gear change, comprising at least one gear with a larger diameter and at least one gear with a smaller diameter (30), said gears cooperating with a chain shiftable between said gears, wherein said gear with a larger diameter comprises at least one sector dedicated to upwards shifting, including shifting aid means to facilitate upwards shifting, and at least one sector dedicated to downwards shifting including shifting aid means to facilitate downwards shifting, said at least one sector for downwards shifting is positioned in an area of said gear with larger diameter that is radially coincidental with the longitudinal axis of a pedal crank when mounted on the gear assembly, and said at least one upwards shifting sector is positioned in an area of the gear with larger diameter that is substantially at 90° to the longitudinal axis of a pedal crank when mounted on the gear assembly.

35. Gear assembly for a bicycle gear change, comprising at least one gear with a larger diameter and at least one gear with a smaller diameter, said gears being destined to cooperate with a chain shiftable from one to the other of said gears to perform a gear change, wherein said gear with a larger diameter comprises at least one upwards shifting sector, including shifting aid means to facilitate upwards shifting, the gear assembly also comprising a pedal crank with a longitudinal axis that is not coincidental with the upwards shifting sector.

36. The gear assembly of claim 35 wherein the gear with a larger diameter comprises at least two diametrically opposed upwards shifting sectors that are not coincidental with the upwards shifting sector.

37. The gear assembly of claim 35 wherein the gear with a larger diameter comprises at least one downwards shifting sector including shifting aid means to facilitate downwards shifting, said at least one downwards shifting sector is positioned in an area of said gear with larger diameter that is coincidental with the longitudinal axis of the pedal crank.

38. The gear assembly of claim 37 wherein the gear with a larger diameter comprises at least two diametrically opposed downwards shifting sectors, both of which are coincidental with the longitudinal axis of the pedal crank.

39. The gear assembly of claim 38 wherein the gear with a larger diameter comprises a second upwards shifting sector, wherein the longitudinal axis of the pedal crank is not coincidental with either of the sectors dedicated to upward shifting.

40. The gear assembly of claim 39 wherein the upwards shifting sectors and the downwards shifting sectors alternate around the circumference of the gear.

41. The gear assembly of claim 40 wherein the upwards shifting sectors and the downwards shifting sectors are complementary to each other.

42. Gear assembly for a bicycle gear change, comprising at least one gear with a larger diameter and at least one gear with a smaller diameter, said gears configures to cooperate with a chain shiftable from one to the other of said gears to perform a gear change, wherein said gear with a larger diameter comprises at least one upwards shifting sector, including shifting aid means to facilitate upwards shifting, the gear assembly also comprising a pedal crank with a longitudinal axis, the position of the axis being considered as a reference point at 0° and the at least one upwards shifting sector extending around at least one of the gears between 15° and 155° or between 195° and 335° with respect to said reference point around a direction of rotation of the gear assembly.

43. The gear assembly of claim 42 wherein the gear with a larger diameter comprises at least one downwards shifting sector including shifting aid means to facilitate downwards shifting, said downwards shifting sector extending between 335° and 15° or between 155° and 195° with respect to said reference point around the direction of rotation of the gear assembly.

44. The gear assembly of claim 43 wherein the gear with a larger diameter comprises at least two upwards shifting sectors including shifting aid means to facilitate upwards shifting, one of which extending between 15° and 155° while the other extending between 195° and 335° with respect to the said reference point around the direction of rotation of the gear assembly.

45. The gear assembly of claim 44 wherein the gear with a larger diameter comprises at least two downwards shifting sectors, including shifting aid means to facilitate downwards shifting, one of which extending between 335° and 15° while the other extends between 155° and 195° with respect to said reference point around the direction of rotation of the gear assembly.

46. Gear assembly for a bicycle gear change, comprising at least one gear with a larger diameter and at least one gear with a smaller diameter, said gears configured to cooperate with a chain shiftable from one to the other of said gears to perform a gear change, the gear assembly also comprising a pedal crank with a longitudinal axis, wherein said gear with a larger diameter comprises at least two downwards shifting sectors located proximate to the axis of the pedal crank and two upwards shifting sectors located complementary to the sectors dedicated to downwards shifting.

47. Gear assembly for a bicycle gear change, comprising at least one gear with a larger diameter and at least one gear with a smaller diameter, said gears configured to cooperate with a chain shiftable from one to the other of said gears to perform a gear change, the gear assembly also comprising a pedal crank with a longitudinal axis, wherein said gear with a larger diameter comprises at least one upwards shifting sector complementary to a zone proximate the crank's axis.

48. The gear assembly of claim 47 wherein the gear with a larger diameter comprises at least two upwards shifting sectors opposite to each others and complementary to two diametrically opposite zones by the crank's axis.

49. Gear assembly for a bicycle gear change, comprising at least one gear with a larger diameter and a first gear with a smaller diameter, said gears configured to cooperate with a chain shiftable from one to the other of said gears to perform a gear change, the gear assembly also comprising a pedal crank with a longitudinal axis, wherein said gear with a larger diameter comprises at least one upwards shifting sector including shifting aid means to facilitate upwards shifting, the shifting aid means being located so as to engage the chain with the gear with the larger diameter when during pedaling, the crank arm has its longitudinal axis oriented substantially in a forward or in a rearward direction.

50. The gear assembly of claim 49 wherein the gear with a larger diameter comprises a second upwards shifting sector diametrically opposite to the first upwards shifting sectors and including shifting aid means to facilitate upwards shifting.

51. The gear assembly of claim 50 wherein the gear with a larger diameter comprises downwards shifting sectors alternated to the upwards shifting sectors and including shifting aid means to facilitate downwards shifting located so as to favor the disengaging of the chain from the gear with the larger diameter when during pedaling the crank arm has its longitudinal axis oriented substantially in a vertical direction.

* * * * *